April 14, 1936.  L. F. NEWTON  2,037,429
TIRE COVER
Filed June 1, 1935
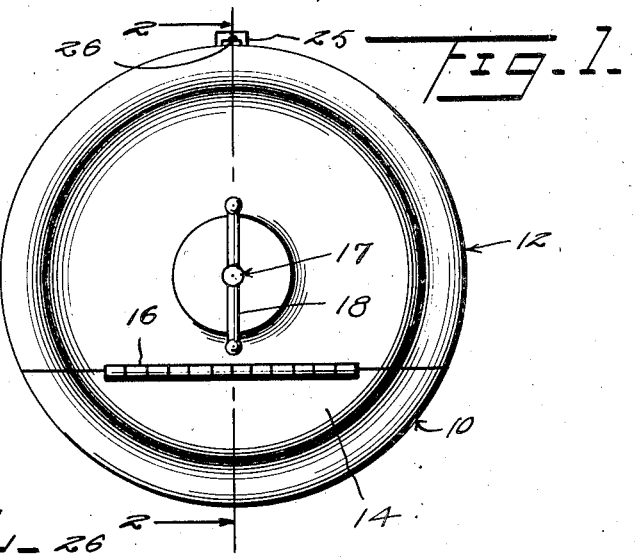
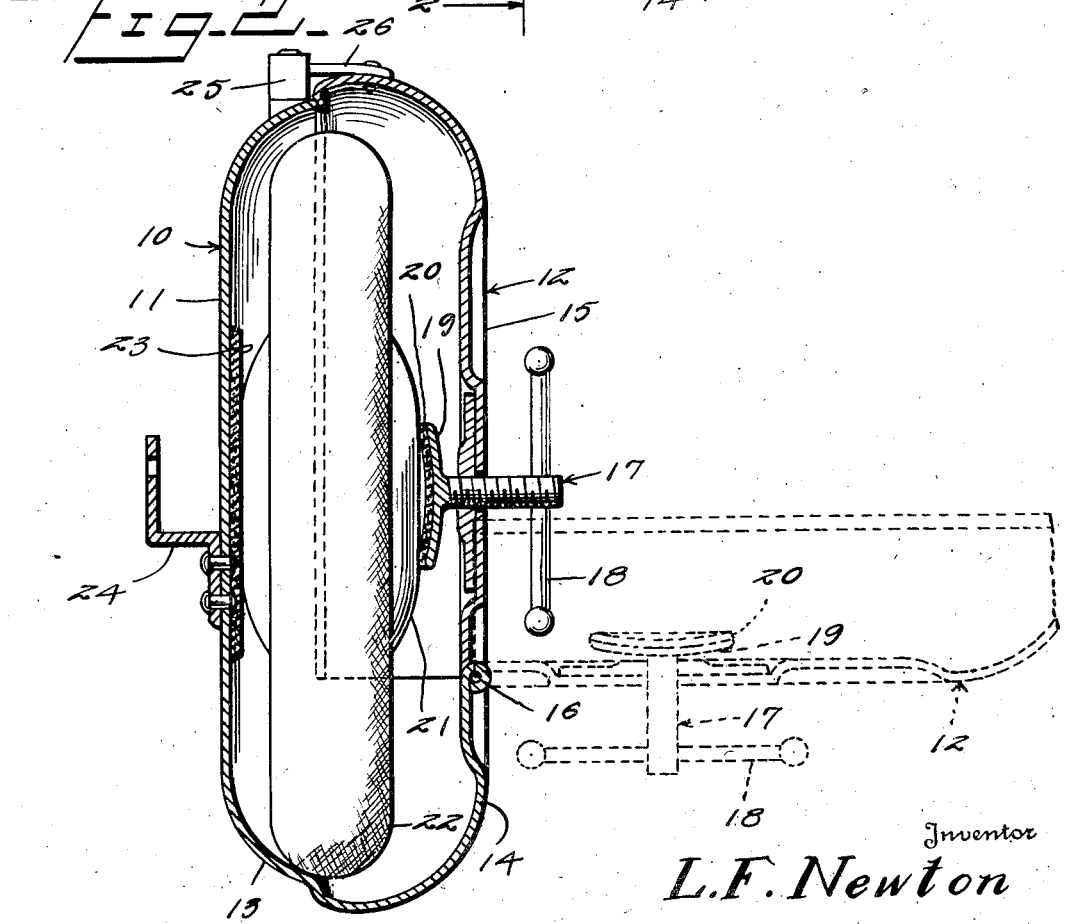
Inventor
L. F. Newton
By Watson E. Coleman
Attorney Patented Apr. 14, 1936

2,037,429

UNITED STATES PATENT OFFICE 2,037,429

TIRE COVER

Lee F. Newton, Wichita Falls, Tex., assignor of one-half to Storey, Storey and Donaghey, a partnership composed of Cecil Storey, John A. Storey, and R. R. Donaghey Application June 1, 1935, Serial No. 24,554

1 Claim. (Cl. 150—54)

This invention relates to vehicle tire covers and more particularly to a cover in the form of a closed casing which is so constructed as to be capable of receiving tires mounted upon wheels.

An object of this invention is to provide a tire cover or casing, preferably made out of metal, which can be readily mounted on any desired portion of a vehicle and which is so constructed as to entirely enclose the tire mounted upon the wheel, the device being of such a construction as to permit the ready placement or removal of the tire and wheel therefrom.

Another object of this invention is to provide a tire cover or casing which is so constructed that the tire and wheel is held against movement by means of a tightening member which extends outwardly of the casing and which may be loosened from outside the casing without permitting the removal of the tire, it being contemplated that a locking means be provided on the casing so as to prevent unauthorized removal of the tire.

The above and various other objects and advantages of this invention will in part be described in, and in part be understood from the following detail description of the present preferred embodiment, the same being illustrated in the accompanying drawing wherein:—

Figure 1 is a detail front elevation of a tire and wheel cover, constructed according to an embodiment of this invention.

Figure 2 is an enlarged vertical section taken on the line 2—2 of Figure 1 and showing in dotted lines the front portion of the cover in open position.

Referring to the drawing wherein like numerals of reference designate corresponding parts throughout the several views, the numeral 10 designates generally a casing comprising a back wall 11 and a front wall 12. The back wall 11 is provided with curved marginal portions 13, the lower portion of which merges into a lower fixed front wall section 14. The front wall 12 has a hinged closure member 15 hinged, as at 16, to the lower front section 14. These two wall sections 11 and 12 are of substantially the configuration of a tire with a solid central portion so as to loosely receeive a tire and wheel on the interior thereof. The closure member 15 has a threaded clamping member 17 extending through the central portion thereof which is provided with a handle 18, by means of which the threaded wheel and tire clamping member 17 may be operated. The inner portion of the clamping member 17 has a cup-shaped or concave wheel hub engaging member 19 provided with a cushioning member 20 on the inner or concave side thereof which is adapted to engage the hub or cap portion 21 of a wheel carrying a tire 22 which is disposed inside of the cover 10.

The back wall 11 has a cushioning member 23 on the inside thereof in confronting position to the clamping member 17 so that the opposite side of the wheel from the hub 21 may be cushioned within the casing or cover 10.

In order to provide a means whereby the cover 10 may be secured to a suitable supporting means, I have provided a bracket 24 on the rear wall 11 which may be of a suitable configuration to engage the desired portion of the vehicle. The curved portion 13 of the back wall 11 has adjacent the upper portion thereof a keeper or one portion of a locking means 25 and another portion of a locking means 26 is carried by the closure 15 so that this closure 15 may be releasably locked in closed position.

In the use of this device, the cover 10 is fastened by means of the bracket 24 to the desired portion of the vehicle with the closure 12 outermost so that the tire and wheel in the casing may be replaced or removed, as may be desired. The tire 22 may be retained on the wheel, as is the custom with present vehicles and the tire and wheel inserted into the cover 10 with the closure 12 in open position, as shown in dotted lines in Figure 2. Initially, the clamping member 17 is loosened and when the closure 12 is locked in closed position, as shown in full lines in Figure 2, the clamping member 17 is then turned until the cushioning member 20 engages the hub cap 21 of the wheel so as to firmly clamp the wheel and tire against the cushioning member 23. It will be apparent from the foregoing that the tire and wheel may be easily inserted into or removed from the casing without requiring any attaching bolts or like fastening elements and that the tire and wheel will be held against movement when disposed within the cover or casing. Preferably, the casing 10 is constructed slightly larger than the tire and wheel so that, if desired, the user of the device may mount an oversized tire on the wheel and still place the tire and wheel within the cover. The device may be secured by means of the bracket 24 or other attaching means to the desired portion of the vehicle with the closure 12 outermost or in a position to permit movement thereof into open or closed position.

It is, of course, understood that various changes and modifications may be made in the details of construction and design of the above specifically described embodiment of this invention without departing from the spirit thereof, such changes and modifications being restricted only by the scope of the following claim.

I claim:

A device as set forth comprising a casing, means for securing the casing to a support, said casing comprising a back wall member, a forwardly extending marginal portion integral with the back wall, a forwardly and upwardly extending front wall integral with the lower portion of the marginal extension, a closure hingedly secured to the upper edge portion of the lower front wall, a threaded member extending through the closure, an operating member upon the outer side of said closure and fixed to said threaded member, a cup-shaped member secured to the inner end of the threaded member, a cushioning member secured to the concave side of the cup-shaped member and engageable with one side portion of a wheel and a second cushioning member secured to the inner side of the back wall in confronting relation to said first cushioning member whereby to yieldably hold a wheel and tire against movement within the casing.

LEE F. NEWTON.